United States Patent
Ishii

(10) Patent No.: US 8,059,165 B2
(45) Date of Patent: Nov. 15, 2011

(54) COLOR PROCESSING APPARATUS, IMAGE PROCESSING APPARATUS, AND METHOD THEREFOR

(75) Inventor: Masatoshi Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 12/420,665

(22) Filed: Apr. 8, 2009

(65) Prior Publication Data

US 2009/0256929 A1 Oct. 15, 2009

(30) Foreign Application Priority Data

Apr. 15, 2008 (JP) .................................. 2008-106111

(51) Int. Cl.
*H04N 9/73* (2006.01)

(52) U.S. Cl. .................... 348/223.1; 348/222.1; 348/370

(58) Field of Classification Search ............... 348/222.1, 348/223.1, 234, 370
See application file for complete search history.

(56) References Cited

U.S. PATENT DOCUMENTS

| | | | |
|---|---|---|---|
| 6,249,601 B1 * | 6/2001 | Kim et al. ...................... | 382/162 |
| 7,206,072 B2 | 4/2007 | Takahashi et al. | |
| 2009/0003696 A1 | 1/2009 | Ishii et al. | |
| 2009/0141975 A1 * | 6/2009 | Li .................................. | 382/167 |

FOREIGN PATENT DOCUMENTS

JP 2004-177396 6/2004

* cited by examiner

*Primary Examiner* — Gevell Selby
(74) *Attorney, Agent, or Firm* — Fitzpatrick, Cella, Harper & Scinto

(57) ABSTRACT

A first image obtained by capturing white paper placed under an illuminant having known illuminant information using an image capturing device is input together with identification information of the illuminant, and illuminant information of the illuminant having the known illuminant information is obtained together with the identification information of the illuminant. A table is generated by associating a chromaticity of the first image with the obtained illuminant information based on the identification information. A second image obtained by capturing the white paper placed under an illuminant having unknown illuminant information using the image capturing device is input, and illuminant information of the illuminant having the unknown illuminant information is estimated from a chromaticity of the second image by referring to the table.

12 Claims, 16 Drawing Sheets

FIG. 8

| FLUORESCENT LAMP ID | x | y | COLOR TEMPERATURE [K] |
|---|---|---|---|
| 1 | 0.30 | 0.32 | 6100 |
| 2 | 0.32 | 0.33 | 5000 |
| 3 | 0.35 | 0.36 | 4000 |
| ... | ... | ... | ... |
| ... | ... | ... | ... |
| LIGHT_MAX_COUNT | 0.30 | 0.31 | 6200 |

| FLUORESCENT LAMP ID | x | y | SPECTRAL TYPE |
|---|---|---|---|
| 1 | 0.30 | 0.31 | BROAD-BAND TYPE |
| 2 | 0.38 | 0.39 | THREE-BAND TYPE |
| 3 | 0.39 | 0.41 | NORMAL TYPE |
| ... | ... | ... | ... |
| ... | ... | ... | ... |
| LIGHT_MAX_COUNT | 0.46 | 0.42 | BROAD-BAND TYPE |

FIG. 18

CAMERA A

| FLUORESCENT LAMP ID | x | y | COLOR TEMPERATURE [K] | SPECTRAL TYPE |
|---|---|---|---|---|
| 1 | 0.30 | 0.32 | 6100 | BROAD-BAND TYPE |
| 2 | 0.32 | 0.33 | 5000 | THREE-BAND TYPE |
| 3 | 0.35 | 0.36 | 4000 | NORMAL TYPE |
| ... | ... | ... | ... | ... |
| LIGHT_MAX_COUNT | 0.30 | 0.31 | 6200 | BROAD-BAND TYPE |

CAMERA B

| FLUORESCENT LAMP ID | x | y | COLOR TEMPERATURE [K] | SPECTRAL TYPE |
|---|---|---|---|---|
| 1 | 0.29 | 0.31 | 6100 | BROAD-BAND TYPE |
| 2 | 0.31 | 0.32 | 5000 | THREE-BAND TYPE |
| 3 | 0.34 | 0.35 | 4000 | NORMAL TYPE |
| ... | ... | ... | ... | ... |
| LIGHT_MAX_COUNT | 0.29 | 0.30 | 6200 | BROAD-BAND TYPE |

CAMERA C

| FLUORESCENT LAMP ID | x | y | COLOR TEMPERATURE [K] | SPECTRAL TYPE |
|---|---|---|---|---|
| 1 | 0.28 | 0.32 | 6100 | BROAD-BAND TYPE |
| 2 | 0.30 | 0.31 | 5000 | THREE-BAND TYPE |
| 3 | 0.33 | 0.34 | 4000 | NORMAL TYPE |
| ... | ... | ... | ... | ... |
| LIGHT_MAX_COUNT | 0.28 | 0.29 | 6200 | BROAD-BAND TYPE |

COLOR PROCESSING APPARATUS, IMAGE PROCESSING APPARATUS, AND METHOD THEREFOR

BACKGROUND OF THE INVENTION

1. Field of the Invention

The present invention relates to color processing for estimating illuminant information of an illuminant.

2. Description of the Related Art

As a process for estimating illuminant information of an illuminant represented by a fluorescent lamp, a process using a spectroradiometer is generally available. This is a process for estimating the illuminant information by measuring the spectral characteristics of an illuminant using a spectroradiometer and analyzing it. When an illuminant is a fluorescent lamp, its illuminant information can be obtained from a light color symbol described in the model of the fluorescent lamp. In addition, there is available a technique of restoring the spectral reflectance of an object from a sensor signal of an image capturing unit such as a digital still camera and estimating illuminant information using anomalous reflection (for example, see Japanese Patent Laid-Open No. 2004-177396).

Illuminant information will be defined herein. The color temperature and spectral type of an illuminant are referred to as illuminant information, hereinafter. Note that a spectral type represents the type of distribution of light emission wavelengths of a fluorescent lamp, that is, a broad-band type, three-band type, and normal type.

To obtain illuminant information using a spectroradiometer, purchase of illuminant measuring equipment is necessary. However, such equipment is expensive in general. For an end user of an image processing apparatus, it is difficult to readily obtain illuminant information by measurement since purchase of equipment forms a barrier against it.

A method of obtaining illuminant information from the model of fluorescent lamp can obtain color temperatures set as spec values, but cannot obtain the color temperature of a fluorescent lamp that has degraded due to aging. In addition, lighting equipment which uses fluorescent lamps often have lampshades attached to them. Since they conceal the model of the fluorescent lamp from users, it is sometimes difficult to obtain illuminant information from the model. In addition, there is an indirect lighting type lighting equipment in which the light of a fluorescent lamp does not directly come outside due to a lampshade. A color and material differ in respective lampshades, and the color temperature of light reflected by or transmitted through a lampshade is sometimes different from the spec value of the fluorescent lamp.

A technique disclosed in Japanese Patent Laid-Open No. 2004-177396 (U.S. Pat. No. 7,206,072) requires an image capturing unit which has four sensors of R, G, B, and X. When an image capturing equipment having such an image capturing unit is not available, illuminant information cannot be obtained.

SUMMARY OF THE INVENTION

In one aspect, a color processing method comprises the steps of: inputting a first image obtained by capturing a white paper placed under an illuminant having known illuminant information using an image capturing device, together with identification information of the illuminant; analyzing a chromaticity of an image; obtaining illuminant information of the illuminant having the known illuminant information, together with the identification information of the illuminant; generating a table obtained by associating the chromaticity of the first image analyzed in the analyzing step with the obtained illuminant information based on the identification information; inputting a second image obtained by capturing the white paper placed under an illuminant having unknown illuminant information using the image capturing device; and estimating, by referring to the table, illuminant information of the illuminant having the unknown illuminant information from chromaticity of the second image analyzed in the analyzing step.

According to the aspect, it is possible to estimate the illuminant information of an illuminant having unknown illuminant information.

Further features of the present invention will become apparent from the following description of exemplary embodiments with reference to the attached drawings.

BRIEF DESCRIPTION OF THE DRAWINGS

FIG. 8 is a view illustrating an example of a color temperature DB.

FIG. 18 is a view for explaining a database for each model of digital camera.

DESCRIPTION OF THE EMBODIMENTS

Color processing of embodiments according to the present invention will be described below in detail with reference to the accompanying drawings.

First Embodiment

Figure 1:
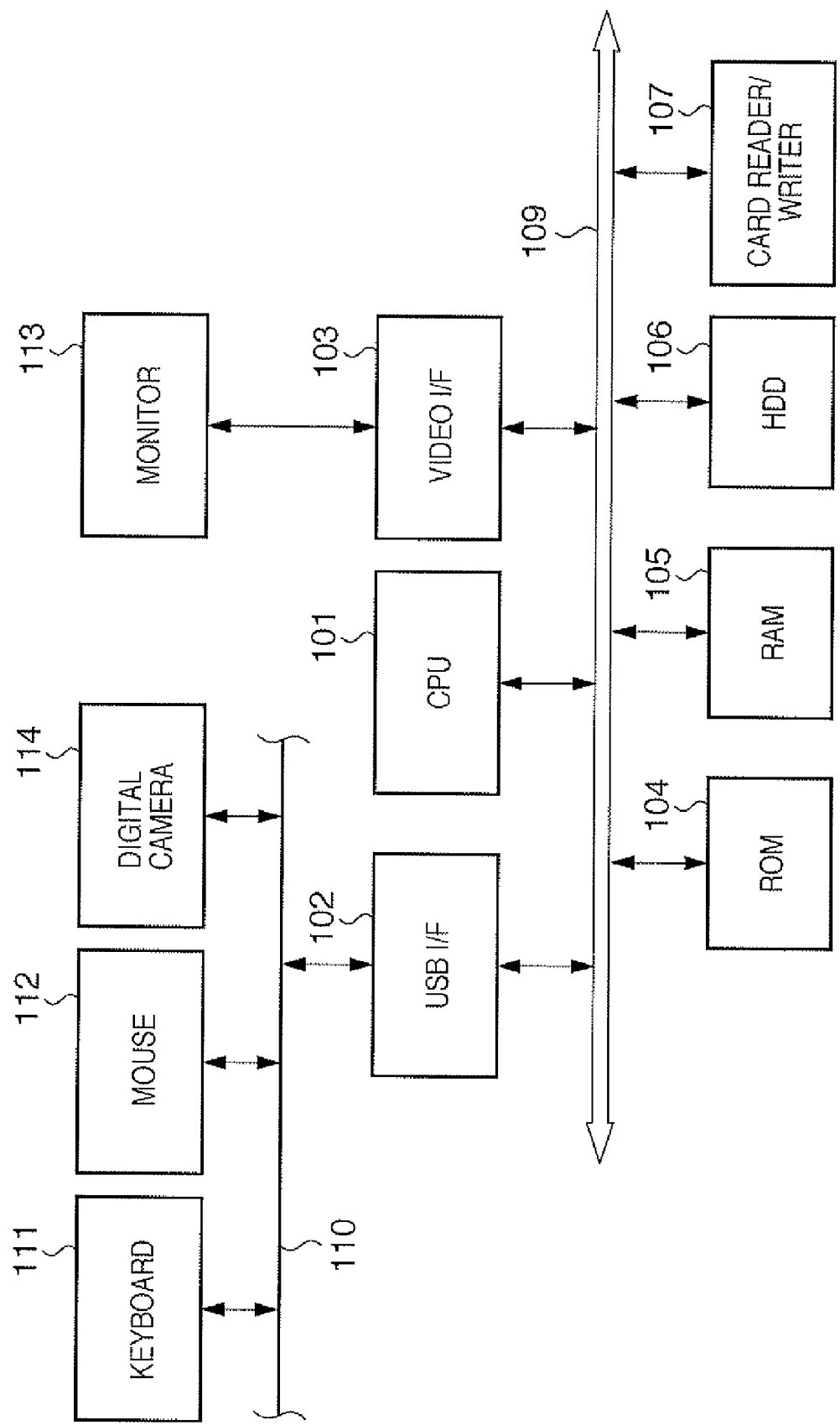
FIG. 1 is a block diagram showing the arrangement of a color processing apparatus of an embodiment.

FIG. 1 is a block diagram showing the arrangement of a color processing apparatus of an embodiment.

Referring to FIG. 1, a microprocessor (CPU) 101 uses a random access memory (RAM) 105 as a work memory to execute an operating system (OS) and various programs stored in a read-only memory (ROM) 104 or a hard disk drive (HDD) 106. The CPU 101 controls components (to be described later) via a system bus 109 to execute color processing to be described later.

A Universal Serial Bus (USB) interface (I/F) 102 is an interface which connects the color processing apparatus to a serial bus 110 such as USB. As devices used by a user to input an instruction and the like to the color processing apparatus, a keyboard 111 and a mouse 112 are connected to the serial bus 110. A digital camera 114 and a printer (not shown) can also be connected to the serial bus 110.

A video interface (I/f) 103 is an interface which connects the color processing apparatus to a monitor 113.

In addition to the OS, a control program executed by the color processing apparatus, a color processing program, and various data are stored in the HDD 106. A card reader/writer 107 reads/writes data from/in a memory card.

A process will be described below in which the color processing apparatus uses the digital camera 114 to obtain the color temperature of a fluorescent lamp whose color temperature is unknown. A process for obtaining the color temperature of a fluorescent lamp using the digital camera 114 can be broadly divided into two processes. One is a process for generating a color temperature database (DB) of fluorescent lamp (to be referred to as color temperature database generation, hereinafter), and the other is a process for estimating the color temperature of a fluorescent lamp, whose color temperature is unknown, by referring to the color temperature DB (to be referred to as color temperature estimating, hereinafter).

[Color Temperature Database Generation]

Figure 2:
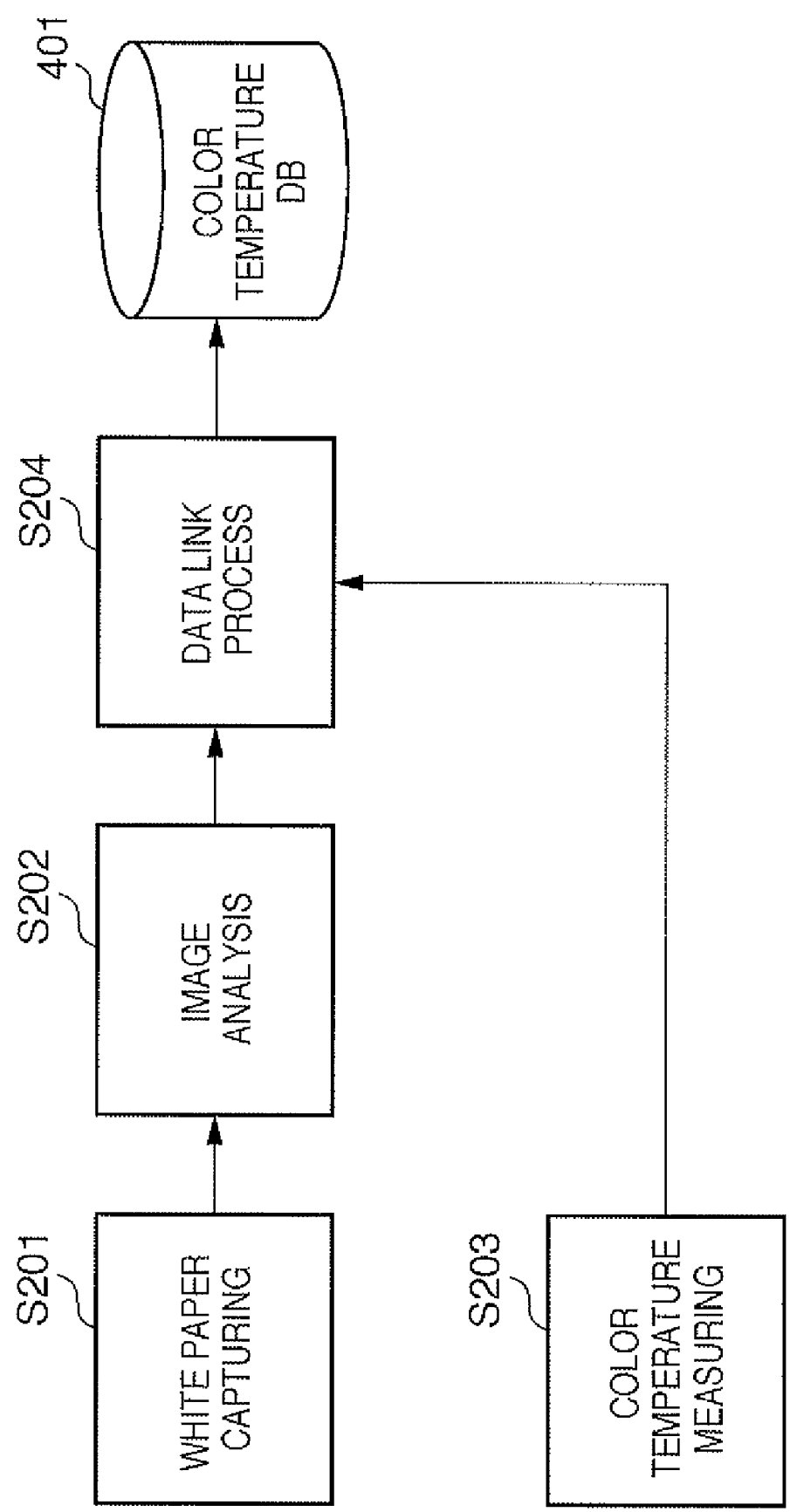
FIG. 2 is a view for explaining color temperature database generation.

FIG. 2 is a view for explaining color temperature database generation. Color temperature database generation includes four processes of white paper capture S201, image analysis S202, color temperature measurement S203, and a data link process S204.

White Paper Capture

Figure 3:
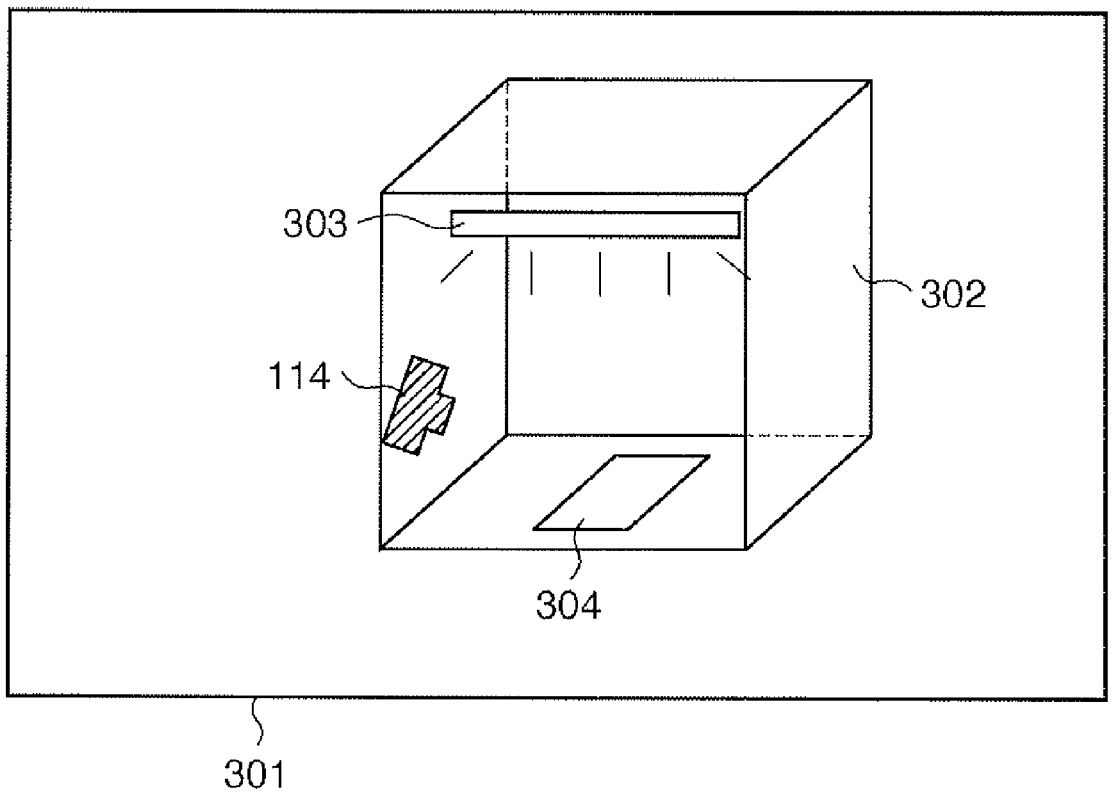
FIG. 3 is a view for explaining a capturing environment upon capturing white paper.

FIG. 3 is a view for explaining a capturing environment upon capturing white paper.

A light booth 302 is placed in a room 301 which is shielded from external light. White paper 304 is placed under a fluorescent lamp 303 in the light booth 302, the fluorescent lamp 303 is turned on, and the white paper 304 is captured using the digital camera 114. Upon capturing, care is taken to make sure that the shadows of a photographer, digital camera 114 and other articles do not fall on the white paper 304, and the white paper 304 is captured at a maximum angle of view. Of course, all illuminations other than the fluorescent lamp 303 are turned off.

The fluorescent lamp 303 used to capture the white paper 304 is one of fluorescent lamps of types to be registered in a color temperature database (for example, fluorescent lamps of all types commercially available). Note that when fluorescent lamps have the same color temperature and spectral type but their makers or brands are different, they are treated as different types.

In the white paper capture S201, one of fluorescent lamps of a plurality of types is mounted in the light booth 302, and the white paper 304 is captured under the fluorescent lamp 303 three times. After capturing the white paper 304 three times, the fluorescent lamp 303 is changed to a fluorescent lamp of another type, and the white paper 304 is similarly captured three times. When the white paper 304 has been captured three times for each of all types of fluorescent lamp, the white paper capture S201 ends.

Figure 4:
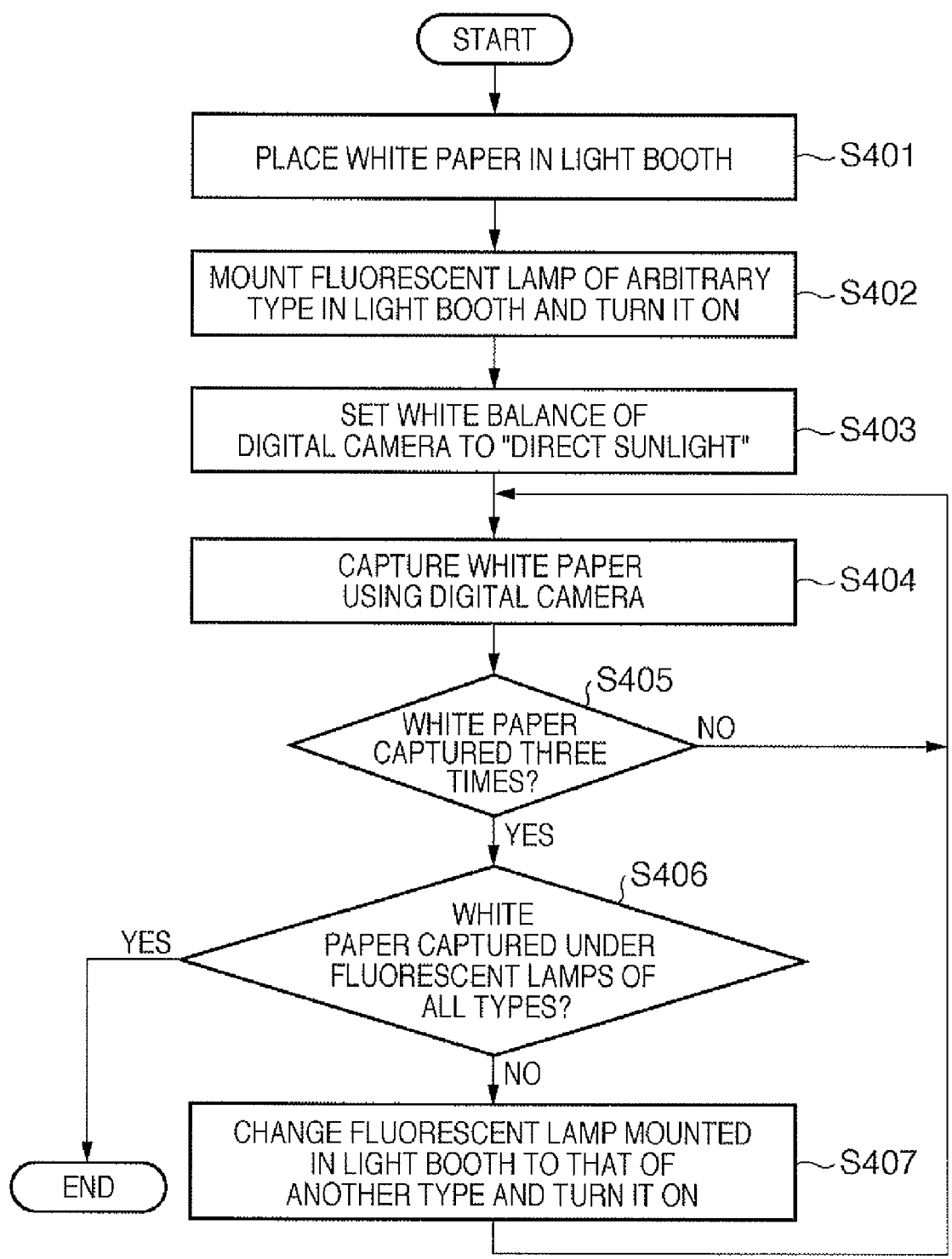
FIG. 4 is a flowchart illustrating a white paper capture procedure in white paper capture.

FIG. 4 is a flowchart illustrating a white paper capture procedure in the white paper capture S201.

The white paper 304 is put in the light booth 302 (S401), a fluorescent lamp of an arbitrary type is mounted in the light booth 302 and turned on (S402), and the white balance (WB) of the digital camera 114 is set to "direct sunlight" (S403). The white paper 304 is captured using the digital camera 114 at a maximum angle of view (S404). In accordance with determination in step S405, the white paper 304 is captured three times (S404).

After capturing the white paper 304 three times, it is determined whether the white paper 304 has been captured under fluorescent lamps of all types to be registered in a color temperature database (S406). If NO in step S406, the fluorescent lamp 303 mounted in the light booth 302 is changed to a fluorescent lamp of another type and the changed lamp is turned on (S407), and the white paper 304 is captured three times again (S404 and S405). Note that a fluorescent lamp of another type is of course a fluorescent lamp under which the white paper 304 has not been captured yet.

By repeating the capturing procedure described above, the captured images of the white paper 304 are obtained by capturing the white paper 304 three times under each of fluorescent lamps of all types to be registered in a color temperature database Of course, in order to identify the type of fluorescent lamp under which image data has been captured, for example, information (a maker name, model, and the like) for identifying the type of fluorescent lamp is appended to the file name of the image data of the captured image (first white paper image) of the white paper 304.

Image Analysis

The image analysis S202 is a process executed by the CPU 101 of the color processing apparatus for analyzing a white paper image captured in the white paper capture S201.

Figure 5:
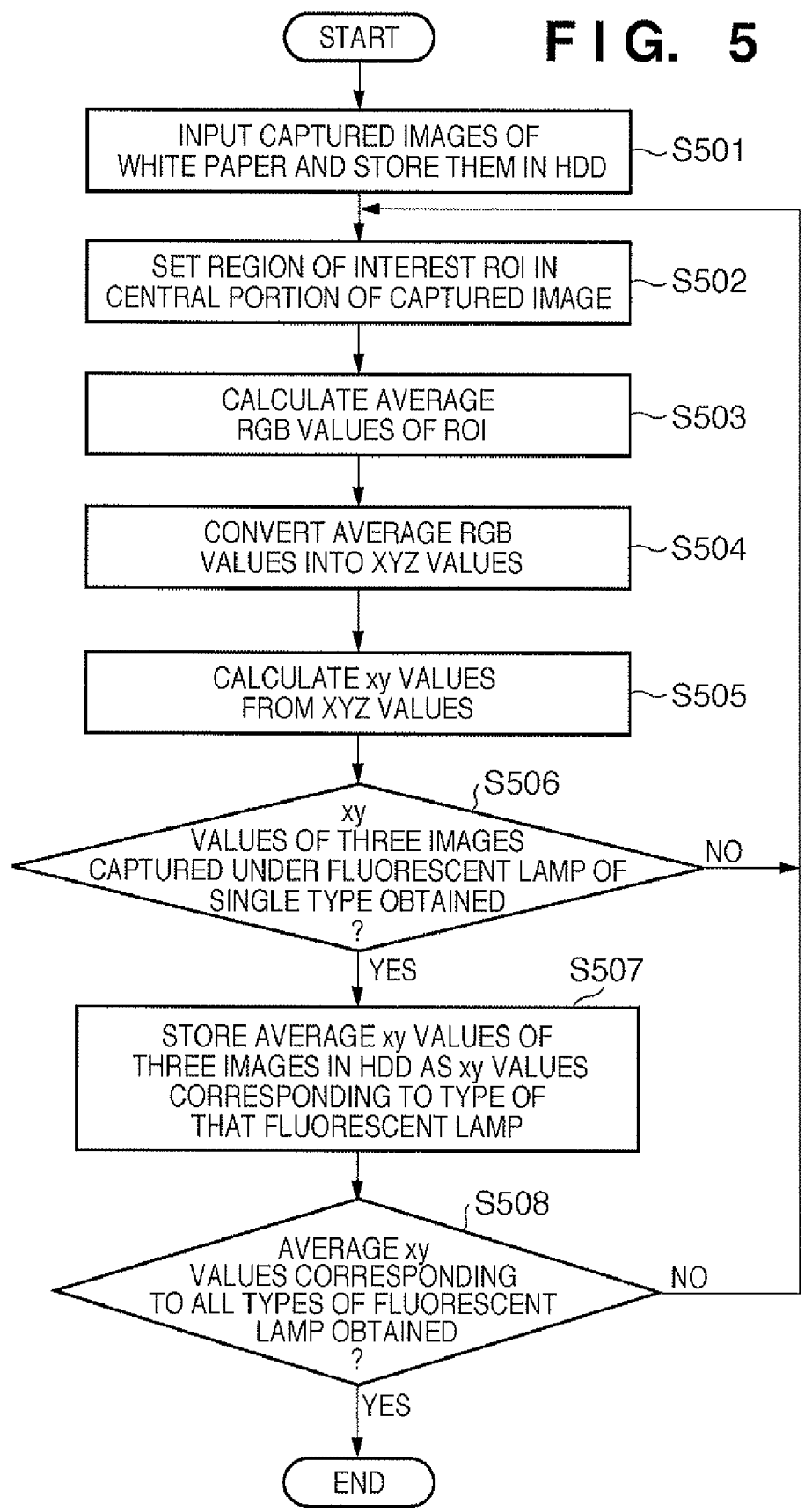
FIG. 5 is a flowchart for explaining image analysis.

FIG. 5 is a flowchart for explaining the image analysis S202.

The CPU 101 inputs the captured images (first white paper images) of the white paper 304 from the digital camera 114 (first input), and stores them in a predetermined area of the HDD 106 (S501). Image data can be obtained from the digital camera 114 via the serial bus 110. Alternatively, a memory card removed from the digital camera 114 may be inserted into the card reader/writer 107 to obtain image data from the memory card.

The CPU 101 then sets a region of interest (ROI) in the central portion of one of the three images of the white paper 304 captured under a given fluorescent lamp (S502), and calculates the average R, G, and B values of the ROI (S503). Details of these steps will be described later. The CPU 101 converts the average R, G, and B values into X, Y, and Z values (S504) using:

$$X = 0.4124 \times R + 0.3575 \times G + 0.1804 \times B$$

$$Y = 0.2127 \times R + 0.7152 \times G + 0.0722 \times B$$

$$Z = 0.0193 \times R + 0.1191 \times G + 0.9502 \times B \quad (1)$$

for $0 \leq R \leq 1.0$, $0 \leq G \leq 1.0$, and $0 \leq B \leq 1.0$

The CPU 101 then calculates chromaticity x and y values from the X, Y, and Z values (S505) using:

$$x = X/(X+Y+Z)$$

$$y = Y/(X+Y+Z) \quad (2)$$

The CPU 101 determines whether the x and y values of the three images captured under a fluorescent lamp of a single type have been obtained (S506). If NO in step S506, the CPU 101 returns the process to step S502 and calculates the x and y values of the other image. After calculating the x and y values of the three images, the CPU 101 stores the average values of those x and y values in a predetermined area of the HDD 106 as x and y values corresponding to the type of this fluorescent lamp (S507).

The CPU 101 determines whether the average x and y values of the captured images stored in the HDD 106 and corresponding to all types of fluorescent lamp have been obtained (S508), and repeats the processes in steps S502 to S507 until average x and y values corresponding to all types of fluorescent lamp to be registered in a color temperature database are obtained.

Setting of RIO

Figure 6:
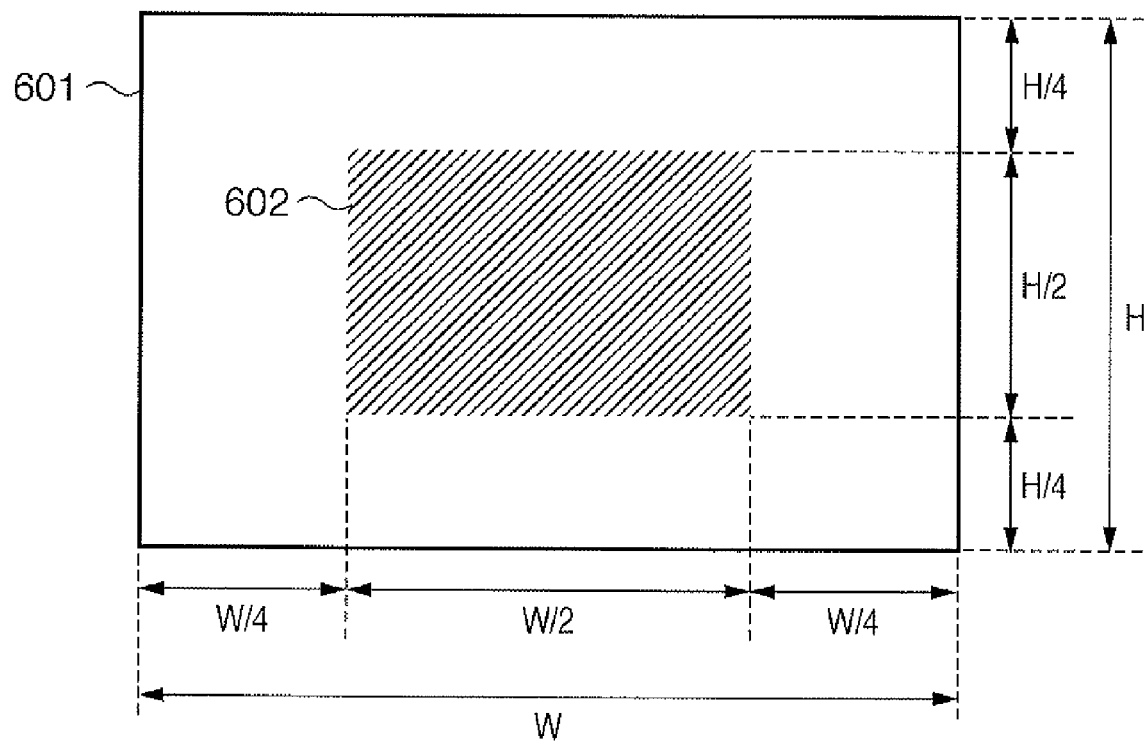
FIG. 6 is a view for explaining an example of an ROI setting method.

FIG. 6 is a view for explaining an example of an ROI setting method.

Letting W be the width of an image 601 and H be its height, the width of an ROI 602 is represented by W/2; the height, H/2; and the area, ¼ that of the image. Assuming that the lengths from the respective sides of the image 601 to the corresponding sides of the ROI 602 are represented by W/4 and H/4, respectively, the CPU 101 sets the ROI 602 in the central portion of the image 601. The length between the corresponding sides, that is, the position of the ROI 602 is not strictly determined, and the ROI 602 only needs to be set in the almost central portion of the image 601.

The ROI 602 is set while considering the possibility that the brightness of the peripheral portion of a captured image drops due to a decrease in peripheral brightness of a lens. This phenomenon occurs depending on the lens used in capturing. To solve this problem, a database of lenses may be prepared, and the position and area of the ROI 602 can be set based on the information of peripheral brightness of the lens used in capturing, which is obtained from the database of lens.

Color Temperature Measurement

The color temperature measurement S203 is a process for measuring using a spectroradiometer the color temperatures of fluorescent lamps of all types used in the white paper capture S201 in the same environment as in the white paper capture S201. Note that all illuminations other than the fluorescent lamp 303 are turned off upon measurement.

Figure 7:
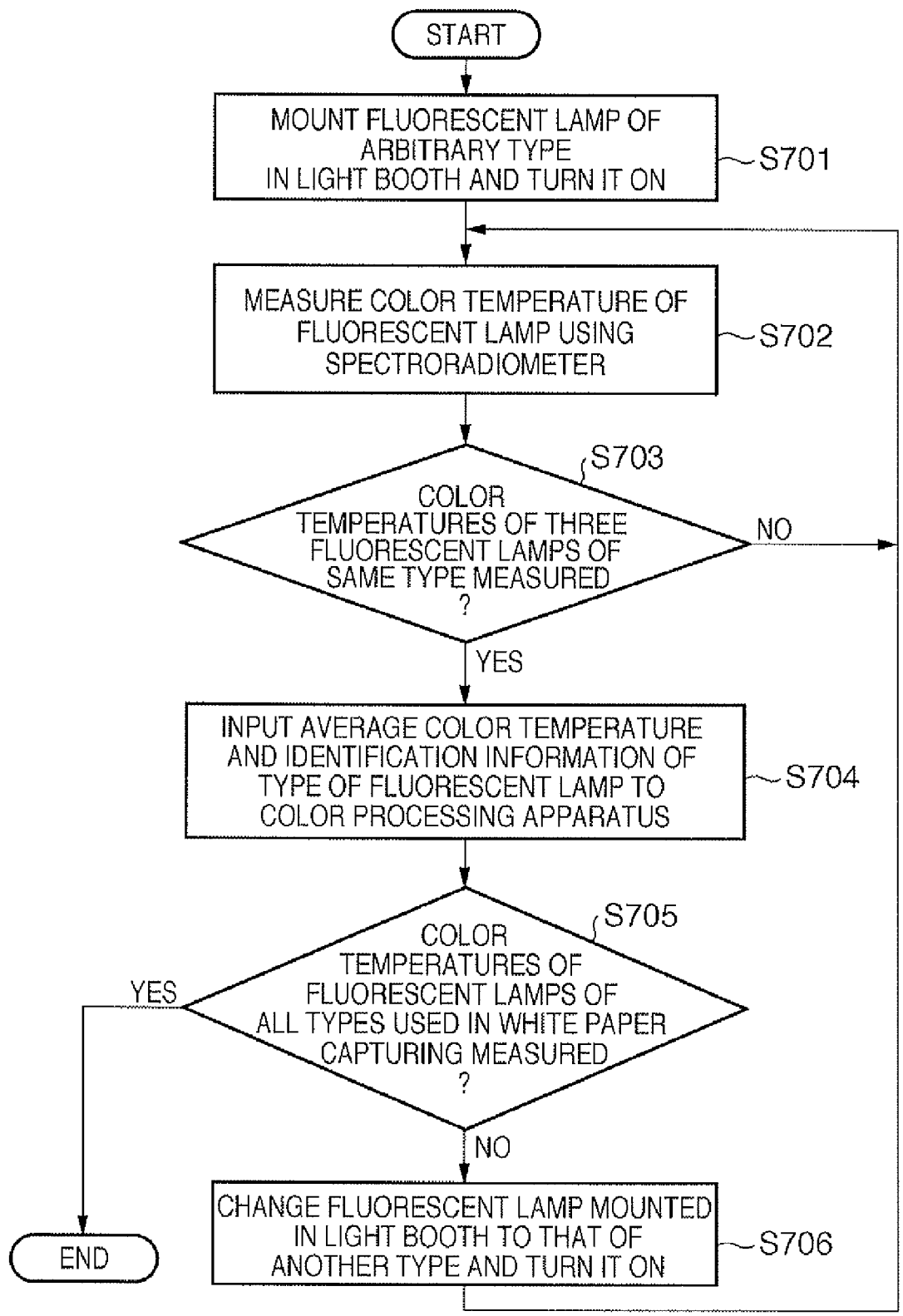
FIG. 7 is a flowchart illustrating a color temperature measurement procedure in color temperature measurement.

FIG. 7 is a flowchart illustrating a color temperature measurement procedure in the color temperature measurement S203.

A fluorescent lamp of an arbitrary type is mounted in the light booth 302 and turned on (S701), and the color temperature of the fluorescent lamp 303 is measured using a spectroradiometer (S702). In accordance with determination in step S703, the color temperatures of three fluorescent lamps of the same type are measured (S702). After measurement of the color temperatures of the three fluorescent lamps of the same type finishes, the average value (average color temperature) of the measurement results and information for identifying the type of fluorescent lamp (a maker name, model, and the like) are input to the color processing apparatus via, for examples the keyboard 111 (S704). The CPU 101 of the color processing apparatus stores the input average color temperature and identification information in a predetermined area of the HDD 106.

When measurement of the color temperatures of three fluorescent lamps of the same type has finished, the CPU 101 determines whether the color temperatures of the fluorescent lamps of all types to be registered in a color temperature database have been measured (S705). If NO in step S705, the fluorescent lamp 303 mounted in the light booth 302 is changed to a fluorescent lamp of another type and the changed lamp is turned on (S706). Then, measurement of the color temperatures of three fluorescent lamps of the same type (S702 and S703) and input of a measurement result (S704) are executed again.

By repeating the measurement procedure as described above, the color temperatures of fluorescent lamps of all types used in the white paper capture S201 are measured.

Data Link Process

The CPU 101 associates average x and y values corresponding to the type of fluorescent lamp calculated in the image analysis S202 with an average color temperature corresponding to the type of fluorescent lamp input in the color temperature measurement S203 based on the identification information to generate a table an example of which is illustrated in FIG. 8. The CPU 101 stores the generated table in a predetermined area of the HDD 106 as a color temperature database (DB) 401 illustrated in FIG. 2 (data link process S204).

In FIG. 8, "fluorescent lamp ID" indicates identification information (ID) uniquely set for a fluorescent lamp of one type, and LIGHT_MAX_COUNT indicates the maximum value of "fluorescent lamp ID", that is, the number of types of fluorescent lamp.

[Color Temperature Estimating]

Figure 9:
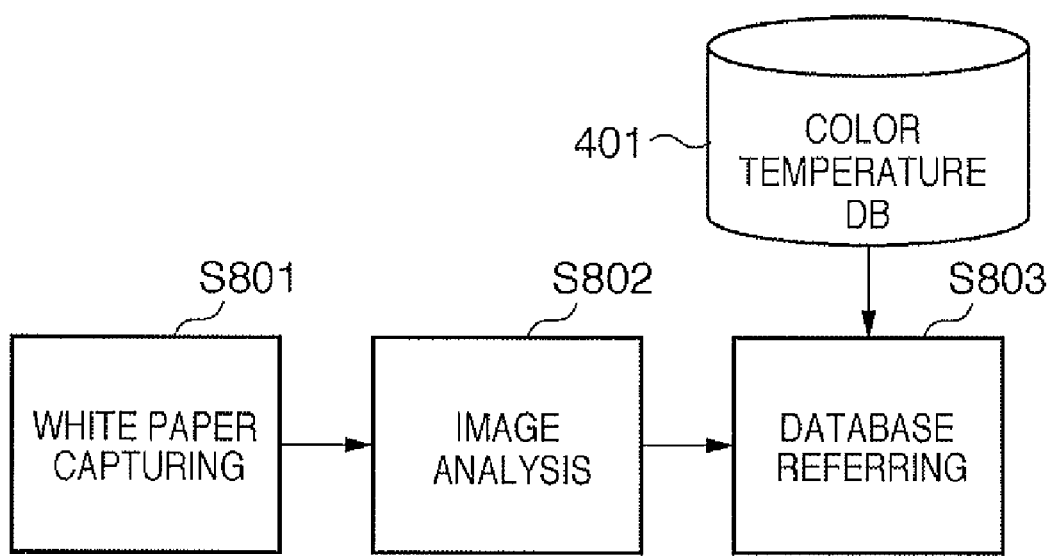
FIG. 9 is a view for explaining color temperature estimating.

FIG. 9 is a view for explaining color temperature estimating. The color temperature estimating includes three processes of white paper capture S801, image analysis S802, and database referring S803.

White Paper Capture

Figure 10:
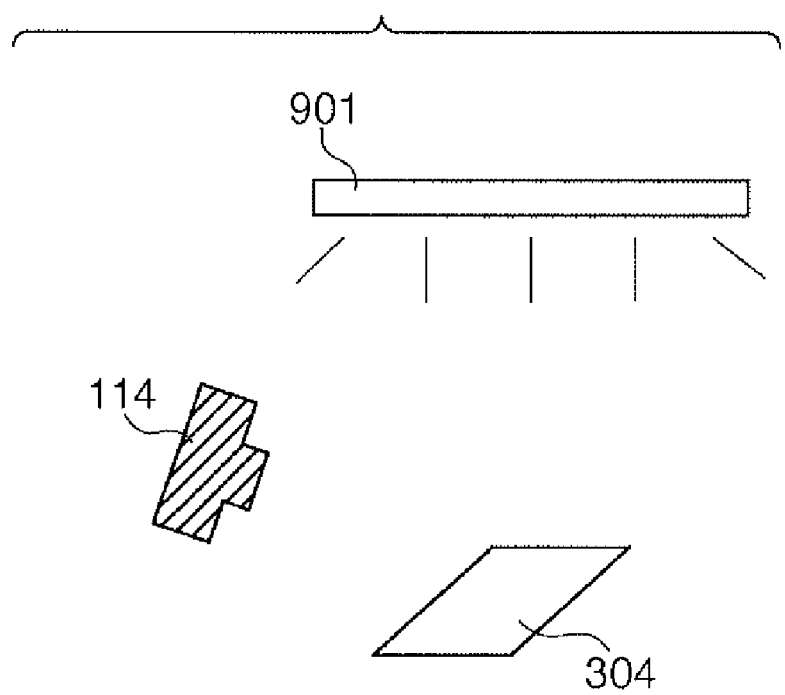
FIG. 10 is a view for explaining a capturing environment upon capturing white paper.

FIG. 10 is a view for explaining a capturing environment upon capturing white paper.

White paper 304 is placed under a fluorescent lamp 901 whose color temperature is unknown, the fluorescent lamp 901 is turned on, and the white paper 304 is captured using a digital camera 114 (white paper capture S801). Upon capturing, care is take to make sure that the shadows of a photographer, digital camera 114 and other articles do not fall on the white paper 304, and the white paper 304 is captured at a maximum angle of view.

As the white paper 304, it is preferable to use paper of the same maker and same model as those of the white paper 304 used in color temperature database generation. Likewise, as the digital camera 114, it is preferable to use a digital camera of the same maker and same model as those of the digital camera 114 used in color temperature database generation. It is desirable to turn off all illuminations other than the fluorescent lamp 901.

Image Analysis

The image analysis S802 is a process executed by the CPU 101 of the color processing apparatus for analyzing a white paper image (second white paper image) captured in the white paper capture S801.

The image analysis S802 corresponds to steps S501 to S505 in the flowchart of FIG. 5. That is, the CPU 101 inputs the captured image (second white paper image) of the white paper 304 from the digital camera 114 (second input), and stores it in a predetermined area of the HDD 106 (S501). The CPU 101 then sets an ROI in the central portion of the captured image (S502), calculates the average R, G, and B values of the ROI (S503), converts the average R, G, and B values into X, Y, and Z values (S504), and calculates chromaticity x and y values from the X, Y, and Z values (S505).

From the above-described processes, x and y values are calculated from the image data of white paper captured under the fluorescent lamp 901 whose color temperature is unknown. These x and y values are referred to as "estimation target x and y values" hereinafter.

Database Referring

The database referring S803 is a process executed by the CPU 101 of the color processing apparatus for estimating, by referring to the color temperature DB 401, a color temperature corresponding to estimation target x and y values calculated in the image analysis S802, that is, the color temperature of the fluorescent lamp 901 whose color temperature is unknown.

Figure 11:
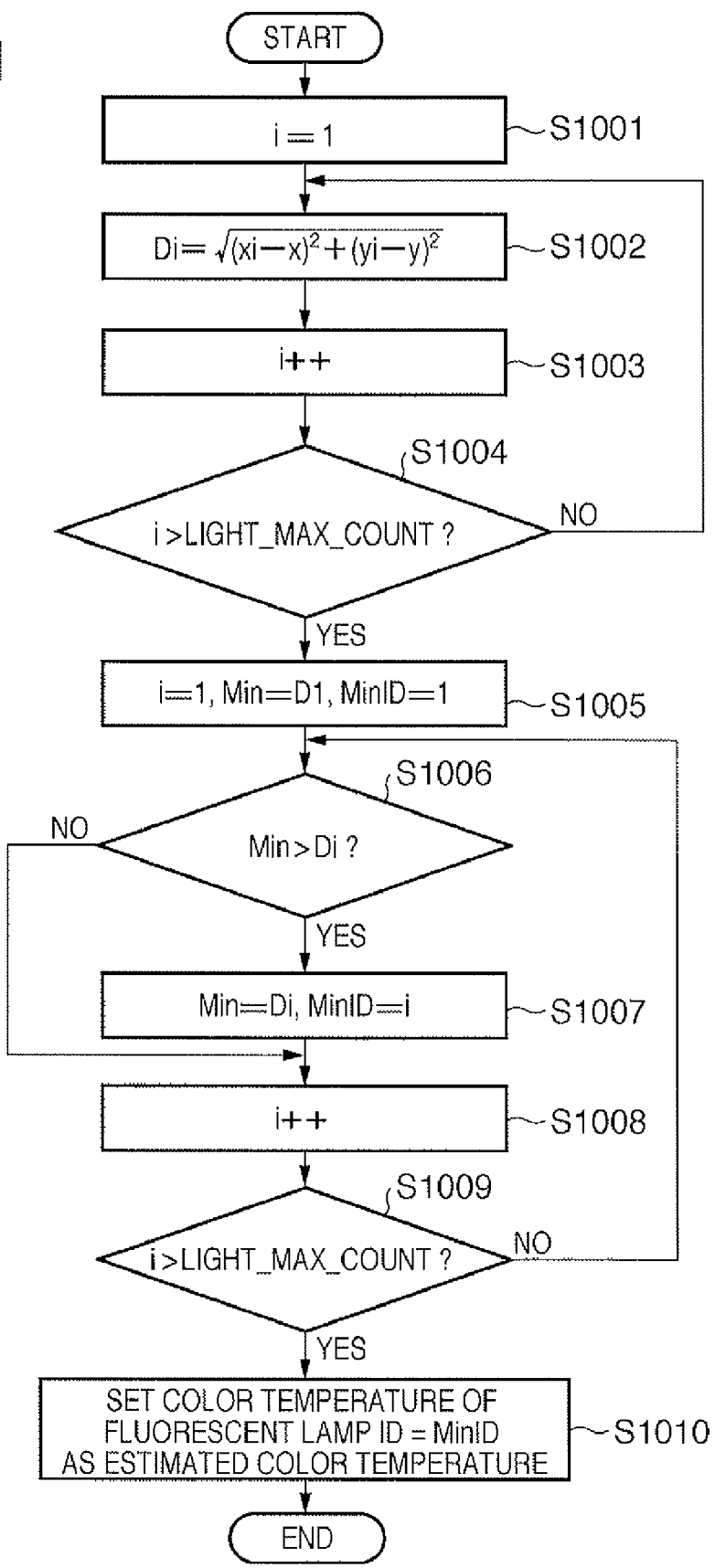
FIG. 11 is a flowchart for explaining database referring.

FIG. 11 is a flowchart for explaining the database referring S803.

The CPU 101 initializes a counter i to 1 (S1001), and calculates a Euclidean distance Di between the estimation target x and y values and the x and y values of each record in the color temperature DB 401 (S1002) using:

$$Di = \sqrt{\{(xi-x)^2 + (yi-y)^2\}} \quad (3)$$

where x and y are the estimation target x and y values, respectively, and xi and yi are the x and y values of a fluorescent lamp ID=i, respectively.

Next, the CPU 101 increments the counter i (S1003), compares the counter i with LIGHT_MAX_COUNT (S1004), and returns the process to step S1002 when i≦LIGHT_MAX_COUNT.

When i>LIGHT_MAX_COUNT in step S1004, the CPU 101 initializes the counter i to 1, a variable Min to D1, and a variable MinID to 1 (S1005). The CPU 101 compares the variable Min with Di (S1006), and advances the process to step S1008 when Min≦Di. When Min>Di, the CPU 101 updates the variable Min to Di and the variable MinID to i (S1007).

The CPU 101 increments the counter i (S1008), compares the counter i with LIGHT_MAX_COUNT (S1009), and returns the process to step S1006 when i≦LIGHT_MAX_COUNT.

When i>LIGHT_MAX_COUNT in step S1009, the CPU 101 obtains the color temperature of the fluorescent lamp ID=MinID from the color temperature DB 401. The CPU 101 executes a process such as displaying on the monitor 113 the obtained color temperature as the estimated color temperature of the fluorescent lamp 901 whose color temperature is unknown (S1010).

In this manner, it is possible to estimate the color temperature of a fluorescent lamp, whose color temperature is unknown, by the color temperature estimating utilizing the color temperature DB 401 generated by color temperature database generation.

Second Embodiment

Color processing of the second embodiment according to the present invention will be described below. Note that the same components as in the first embodiment are denoted by the same reference numerals in the second embodiment, and a detailed description thereof will not be repeated.

A process will be described below in which a color processing apparatus uses a digital camera 114 to estimate the spectral type of a fluorescent lamp whose spectral type is unknown. A process for estimating the spectral type of a fluorescent lamp using the digital camera 114 can be broadly divided into two processes. One is a process for generating a spectral type DB of fluorescent lamp (to be referred to as spectral type-database generation, hereinafter), and the other is a process for estimating the spectral type of fluorescent lamp, whose spectral type is unknown, by referring to the spectral type DB (to be referred to as spectral type estimating, hereinafter).

[Spectral Type-database Generation]

Figure 12:
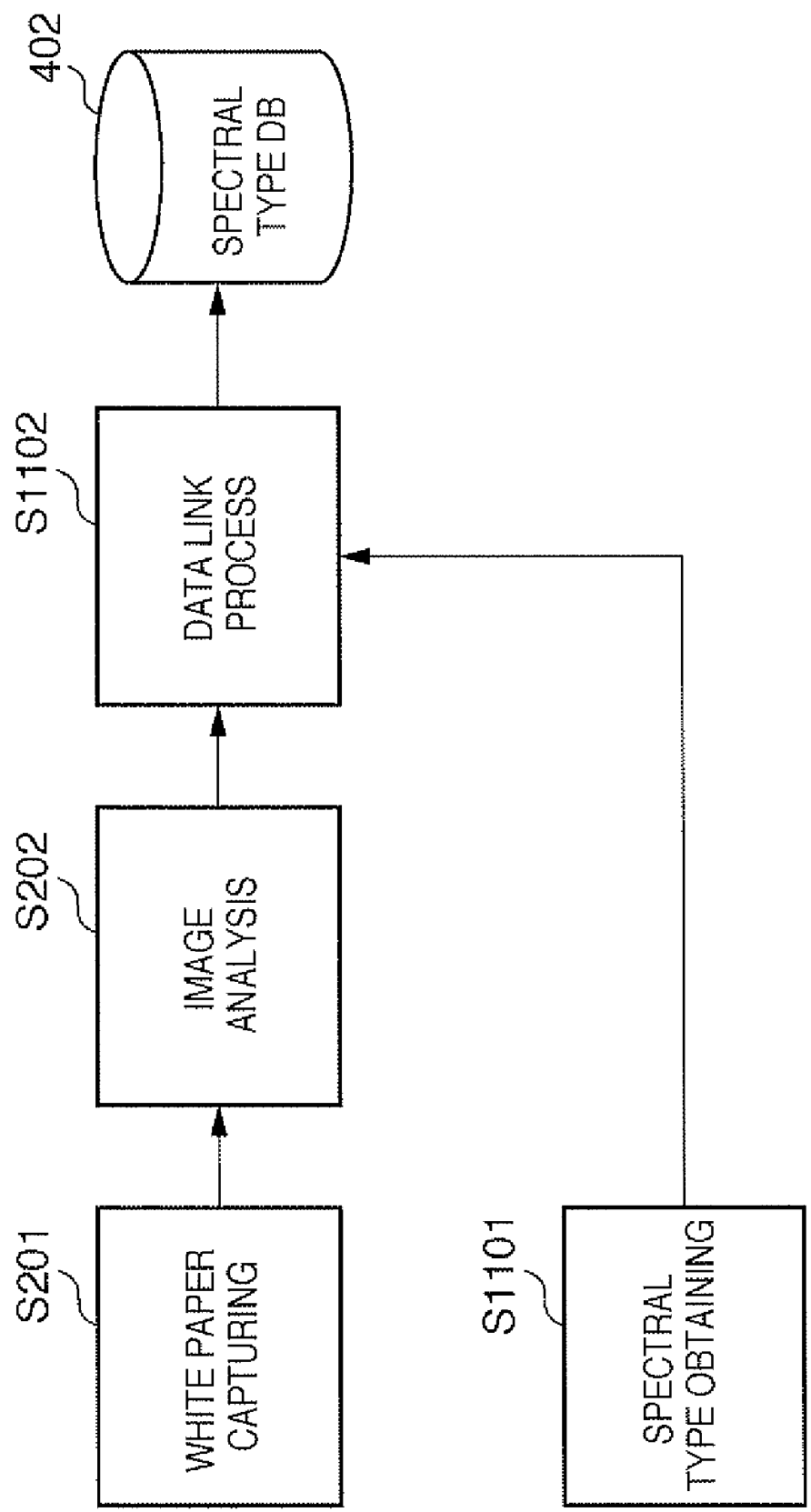
FIG. 12 is a view for explaining spectral type-database generation.

FIG. 12 is a view for explaining spectral type-database generation. The spectral type-database generation includes four processes of white paper capture S201, image analysis S202, spectral type obtaining S1101, and a data link process S1102. Note that the white paper capture S201 and image analysis S202 are the same as those in the first embodiment, and a description thereof will not be repeated.

Spectral Type Obtaining

The spectral type obtaining S1101 is a process for obtaining the spectral types of fluorescent lamps of all types used in the white paper capture S201.

A spectral type includes three types of a broad-band type, three-band type, and normal type, and can be obtained from the model of fluorescent lamp or the like. In general, a light color symbol is described in the model of fluorescent lamp and a spectral type can be specified from the model. For example, when a light color symbol includes "SDL", it indicates a broad-band type, and when a light color symbol includes "EDL", it indicates a broad-band type particularly for color evaluation. When a light color symbol includes "EX", it indicates a three-band type, and when a light color symbol does not include any of them, it indicates a normal type. In this manner, a spectral type can be specified.

A spectral type may be specified using another method without specifying it from a model or the like. For example, the light of a fluorescent lamp may be measured using a spectroradiometer, and its spectral distribution may be analyzed to specify a spectral type.

Information indicating the specification result (spectral type) and information (a maker name, model, and the like) for identifying the type of fluorescent lamp are input to the color processing apparatus via, for example, a keyboard 111. A CPU 101 of the color processing apparatus stores the input spectral type information and identification information in a predetermined area of an HDD 106.

Data Link Process

Figures 13, 14:
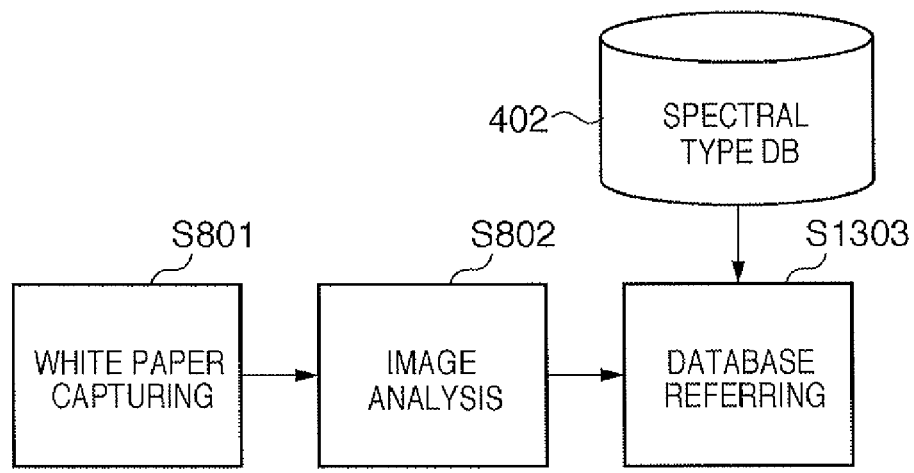
FIG. 13 is a view illustrating an example of a spectral type DB.
FIG. 14 is a view for explaining spectral type estimating.

The CPU 101 associates average x and y values corresponding to the type of fluorescent lamp calculated in the image analysis S202 with a spectral type corresponding to the type of fluorescent lamp input in the spectral type obtaining S1101 based on the identification information to generate a table an example of which is illustrated in FIG. 13. The CPU 101 stores the generated table in a predetermined area of the HDD 106 as a spectral type DB 402 illustrated in FIG. 12 (data link process S1102).

In FIG. 13, "fluorescent lamp ID" indicates identification information (ID) uniquely set for a fluorescent lamp of one type, and LIGHT_MAX_COUNT indicates a maximum value of "fluorescent lamp ID", that is, the number of types of fluorescent lamp.

[Spectral Type Estimating]

FIG. 14 is a view for explaining spectral type estimating. The spectral type estimating includes three processes of white paper capture S801, image analysis S802, and database referring S1303. Note that the white paper capture S801 and image analysis S802 are the same as those in the first embodiment, and a description thereof will not be repeated.

Database Referring

The database referring S1303 is a process executed by the CPU 101 of the color processing apparatus for estimating, by referring to the spectral type DB 402, a spectral type corresponding to estimation target x and y values calculated in the image analysis S802, that is, the spectral type of a fluorescent lamp 901 whose spectral type is unknown.

Figure 15:
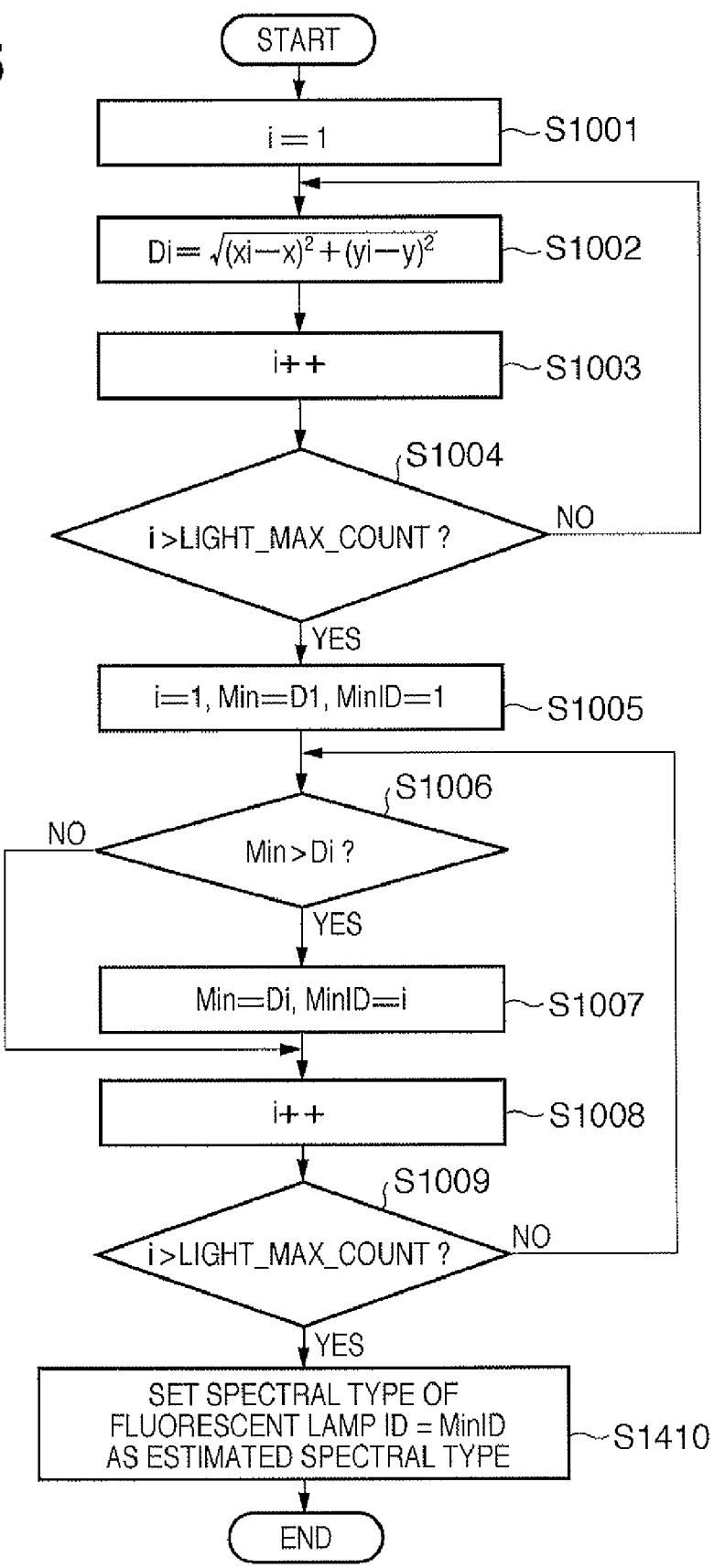
FIG. 15 is a flowchart for explaining database referring.

FIG. 15 is a flowchart for explaining the database referring S1303. The database referring S1303 is different from the database referring S803 illustrated in FIG. 11 in step S1410. More specifically, the CPU 101 obtains the spectral type of fluorescent lamp ID=MinID from the spectral type DB 402, and executes a process such as displaying on a monitor 113 the obtained spectral type as the estimated spectral type of fluorescent lamp 901 whose spectral type is unknown (S1410).

In this manner, it is possible to estimate the spectral type of a fluorescent lamp whose spectral type is unknown by the spectral type estimating utilizing the spectral type DB 402 generated by the spectral type-database generation.

Modification of Embodiments

The first and second embodiments utilize the fact that the R, G, and B values of the captured image of white paper captured while fixing the WB parameter of a digital camera vary depending on an illuminant used in capturing. Accordingly, the WB mode is not limited to "direct sunlight", but other WB modes may be used as long as a WB parameter does not vary but is fixed in that mode. In contrast, a mode such as "auto white balance" in which a digital camera adjusts a WB parameter in accordance with an illuminant cannot be used. Of course, a WB mode used in color temperature/spectral type database generation needs to correspond with a WB mode used in color temperature/spectral type estimating.

It is also possible to simultaneously estimate the color temperature and spectral type of a fluorescent lamp whose color temperature and spectral type are unknown by combining the color temperature DB 401 and spectral type DB 402.

In addition, an illuminant to be estimated is not limited to a fluorescent lamp if the color temperature DB 401 and/or spectral type DB 402 can be generated utilizing an illuminant having known illuminant information.

According to the first and second embodiments, after the color temperature DB 401 and/or spectral type DB 402 is generated, it becomes possible to obtain the illuminant information of an illuminant having unknown illuminant information by utilizing a general purpose image capturing device such as a digital camera and white paper. At this time, it is possible to obtain illuminant information in which an effect of a lampshade and that of aging of an illuminant are reflected.

Third Embodiment

Color processing of the third embodiment according to the present invention will be described below. Note that the same components as in the first and second embodiments are denoted by the same reference numerals in the third embodiment, and a detailed description thereof will not be repeated.

A color temperature DB 401 and a spectral type DB 402 need to be generated for each model of digital camera. Accordingly, color temperature database generation and spectral type-database generation are executed for respective models of digital camera to generate databases for respective models as illustrated in FIG. 18, and the they are stored in a predetermined area of an HDD 106.

Figure 19:
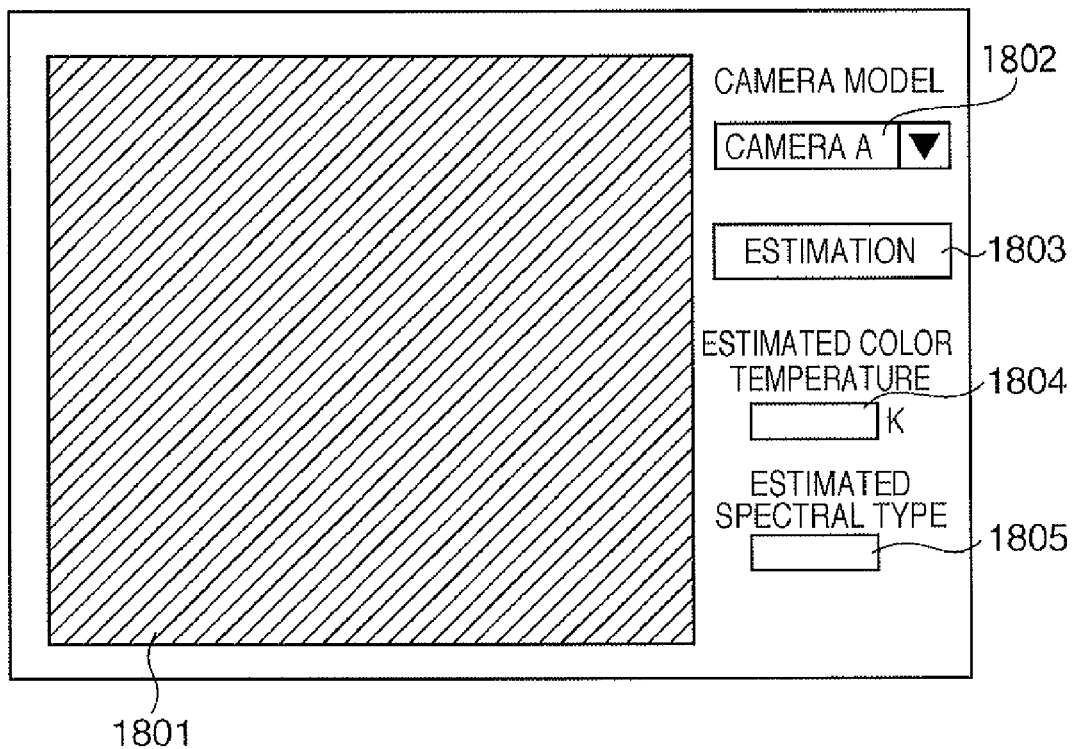
FIGS. 19 and 20 are views illustrating examples of a user interface displayed on a monitor by color temperature/spectral type estimation application software running on a color processing apparatus.

FIG. 19 is a view illustrating an example of a user interface (UI) displayed on a monitor 113 by color temperature/spectral type estimation application software running on a color processing apparatus.

When the captured image of a white paper is input by white paper capture S801, a CPU 101 displays it in a display region 1801. A user manipulates a combo box 1802 for selecting the model of digital camera to select the model of a digital camera used in the white paper capture S801 and presses an estimation button 1803. The CPU 101 refers to a database corresponding to the selected model, displays an estimated color temperature corresponding to the white paper image in a display section 1804, and displays an estimated spectral type in a display section 1805.

Note that instead of selecting the model of digital camera by a user, the CPU 101 may specify the model of digital camera from information (Exif data) appended to the captured image of the white paper.

In addition, a color temperature/spectral type database may be generated using a digital camera of a given type as a reference camera, and the variation amount of a digital camera of another type with respect to the reference camera may be stored in the database.

Furthermore, a database may be prepared not for each model of digital camera but for each type (maker name and model) of white paper, and a color temperature and spectral type may be estimated according to the type of white paper and the model of digital camera. In this case, a combo box for selecting the type of white paper is provided to the UI of FIG. 19 in addition to the combo box 1802 for selecting the model of camera.

Fourth Embodiment

Color processing of the fourth embodiment according to the present invention will be described below. Note that the same components as in the first to third embodiments are denoted by the same reference numerals in the fourth embodiment, and a detailed description thereof will not be repeated.

The fourth embodiment will exemplify a case in which a database obtained by combining a color temperature DB 401 and a spectral type DB 402 corresponding to the model of a digital camera is stored in the ROM or the like of the digital camera, and the color temperature and spectral type of a fluorescent lamp are estimated using the "illuminant information obtaining mode" of the digital camera.

Figure 16:
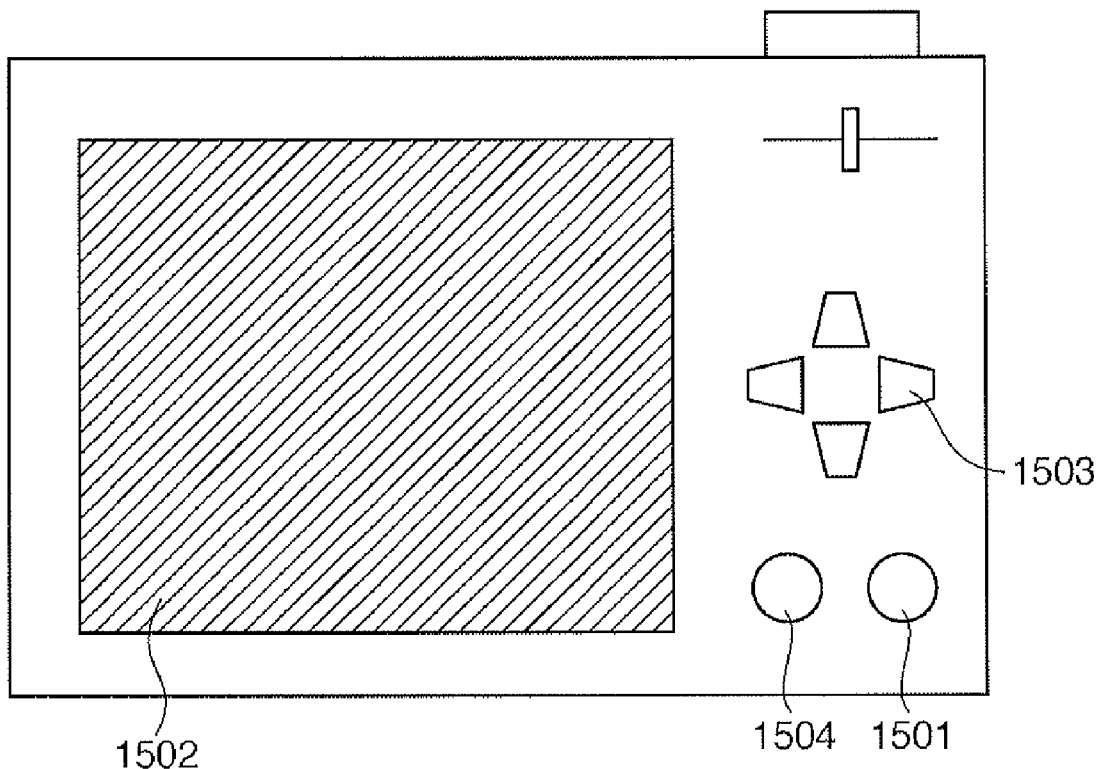
FIG. 16 is a view illustrating the back surface of a digital camera.

FIG. 16 is a view illustrating the back surface of a digital camera.

Figure 17:
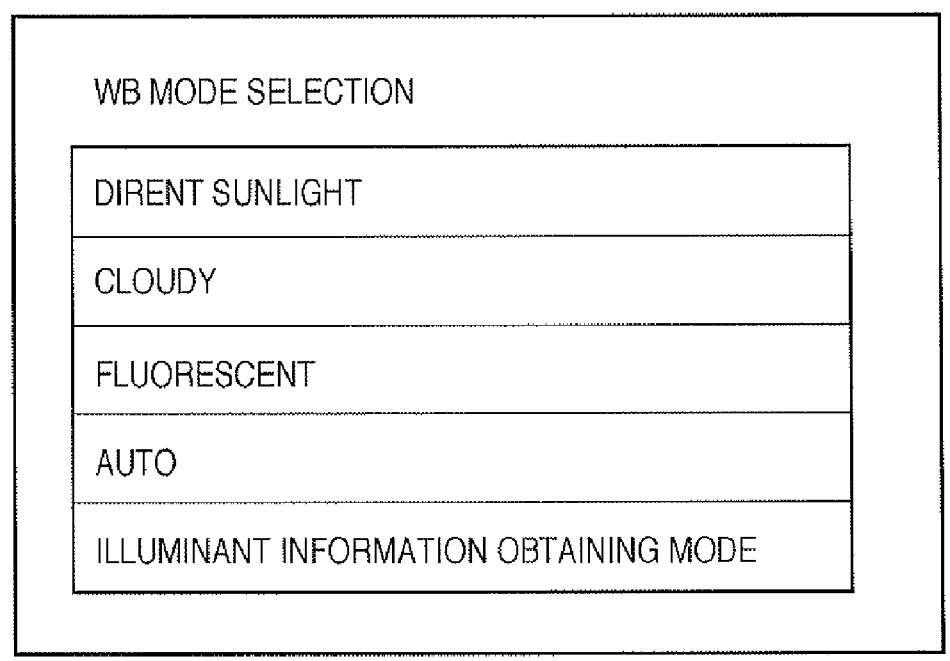
FIG. 17 is a view illustrating an example of a WB mode selection menu.

A user manipulates a WB mode selection button 1501 to set the WB mode of the digital camera. When the WB mode selection button 1501 is pressed, the digital camera displays a WB mode selection menu as illustrated in FIG. 17 on a liquid crystal monitor 1502.

The user manipulates selection keys 1503 to select an "illuminant information obtaining mode" from the WB mode selection menu, and presses a determination key 1504 to set the digital camera to the illuminant information obtaining mode. Note that the WB parameter of the digital camera set to the illuminant information obtaining mode fixes to a predetermined value.

After this operation, when the user executes white paper capture S801 under a fluorescent lamp whose color temperature and spectral type are unknown, the CPU of the digital camera displays an estimated color temperature and estimated spectral type on the liquid crystal monitor 1502.

Note that the "illuminant information obtaining mode" is not limited to be selected as one of WB modes, but may be selected as one of capturing modes. However, irrespective of the selection method used, the WB parameter needs to be fixed.

Fifth Embodiment

Color processing of the fifth embodiment according to the present invention will be described below. Note that the same components as in the first to fourth embodiments are denoted by the same reference numerals in the fifth embodiment, and a detailed description thereof will not be repeated.

The first embodiment has exemplified a case in which the CPU 101 sets an ROI in the image analysis S202 and S802. The fifth embodiment will exemplify a case in which a rectangular ROI of an arbitrary size is set in an arbitrary position in a captured image in accordance with a user's instruction. Setting an ROI in accordance with a user's instruction is effective since when a shadow or an article other than white paper is captured in the captured image of the white paper, it is possible not to use that region in image analysis S202 and S802 in accordance with user's decision.

Figure 20:
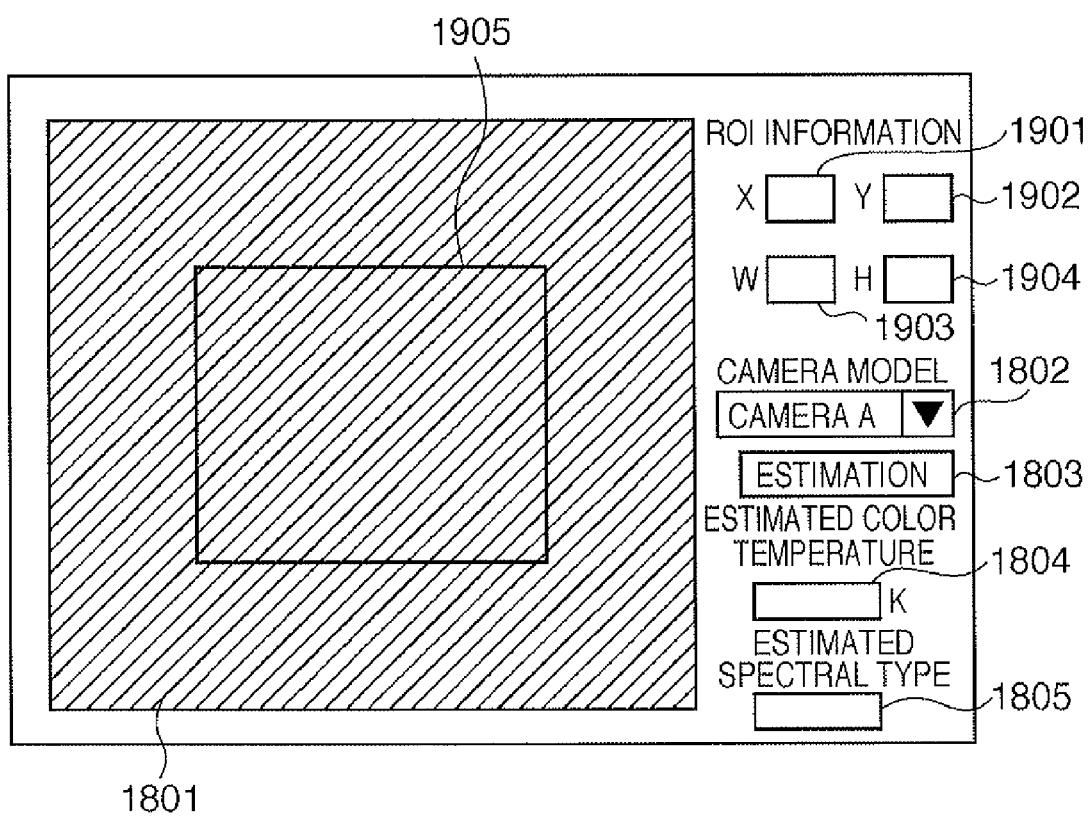

FIG. 20 is a view illustrating an example of a user interface (UI) displayed on a monitor 113 by color temperature/spectral type estimation application software running on a color processing apparatus. The same components as in the UI illustrated in FIG. 19 will not be described.

The UI includes four edit boxes 1901 to 1904 and displays an ROI region frame 1905 in a display region 1801. The edit box 1901 is used to display and input an x coordinate at the upper left corner of the ROI. The edit box 1902 is used to display and input a y coordinate at the upper left corner of the ROI. The edit box 1903 is used to display and input a window width W of the ROI. The edit box 1904 is used to display and input a window height H of the ROI.

When a user inputs numeric values in the four edit boxes, a CPU 101 displays the ROI region frame 1905 corresponding to the input position and size in the display region 1801. The user can set an ROI with an arbitrary position and size. Alternatively, the user can set an ROI with an arbitrary position and size by manipulating a mouse 112 to adjust the frame 1905 to a desired position and size.

Note that the shape of an ROI is not limited to a rectangular, and it can be any shape as long as the region has an area equal to or larger than a predetermined area. For example, when the shape of an ROI is a circle, the ROI can be set using a combination of the center coordinates (X, Y) and a radius R of the ROI.

Exemplary Embodiments

The present invention can be applied to a system constituted by a plurality of devices (e.g., host computer, interface, reader, printer) or to an apparatus comprising a single device (e.g., copying machine, facsimile machine)

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforementioned storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-106111, filed Apr. 15, 2008, which is hereby incorporated by reference herein in its entirety.

What is claimed is:

1. A color processing apparatus comprising:
   a first inputting section, configured to input a first image obtained by capturing a white paper placed under an illuminant having known illuminant information using an image capturing device, together with identification information of the illuminant;
   an analyzer, configured to analyze a chromaticity of an image;
   an obtaining section, arranged to obtain illuminant information of the illuminant having the known illuminant information, together with the identification information of the illuminant;
   a generator, configured to generate a table obtained by associating the chromaticity of the first image analyzed by said analyzer with the obtained illuminant information based on the identification information;
   a second inputting section, configured to input a second image obtained by capturing the white paper placed under an illuminant having unknown illuminant information using the image capturing device; and
   an estimator, configured to estimate, by referring to the table, illuminant information of the illuminant having the unknown illuminant information from chromaticity of the second image analyzed by said analyzer.

2. The apparatus according to claim 1, further comprising a monitor arranged to display the estimated illuminant information.

3. The apparatus according to claim 1, wherein the illuminant information is a color temperature.

4. The apparatus according to claim 1, wherein the illuminant information is a spectral type.

5. The apparatus according to claim 1, wherein said generator generates the table for each model of image capturing device.

6. The apparatus according to claim 1, wherein said generator generates the table for each type of white paper.

7. An image processing apparatus comprising:
   a memory which stores a table generated by a color processing apparatus according to claim 1;
   a capturing section, configured to capture white paper placed under an illuminant having unknown illuminant information;
   an analyzer, configured to analyze a chromaticity of an image of the white paper captured by said capturing section; and
   an estimator, configured to estimate, by referring to the table, illuminant information of the illuminant having the unknown illuminant information from the chromaticity analyzed by said analyzer.

8. The apparatus according to claim 7, further comprising a monitor arranged to display the estimated illuminant information.

9. A color processing method, which is carried out in an information processing apparatus, the method comprising the steps of:

inputting a first image obtained by capturing a white paper placed under an illuminant having known illuminant information using an image capturing device, together with identification information of the illuminant;

analyzing a chromaticity of an image;

obtaining illuminant information of the illuminant having the known illuminant information, together with the identification information of the illuminant;

generating a table obtained by associating the chromaticity of the first image analyzed in the analyzing step with the obtained illuminant information based on the identification information;

inputting a second image obtained by capturing the white paper placed under an illuminant having unknown illuminant information using the image capturing device; and estimating, by referring to the table, illuminant information of the illuminant having the unknown illuminant information from chromaticity of the second image analyzed in the analyzing step.

10. An image processing method, which is carried out in an information processing apparatus, the method comprising the steps of:

storing a table generated in a color processing method according to claim 9 into a memory;

capturing white paper placed under an illuminant having unknown illuminant information;

analyzing a chromaticity of an image of the white paper captured in the capturing step; and estimating, by referring to the table, illuminant information of the illuminant having the unknown illuminant information from the chromaticity analyzed in the analyzing step.

11. A computer-readable storage medium storing a computer-executable program for causing a computer to perform a color processing method, the method comprising the steps of:

inputting a first image obtained by capturing a white paper placed under an illuminant having known illuminant information using an image capturing device, together with identification information of the illuminant;

analyzing a chromaticity of an image;

obtaining illuminant information of the illuminant having the known illuminant information, together with the identification information of the illuminant;

generating a table obtained by associating the chromaticity of the first image analyzed in the analyzing step with the obtained illuminant information based on the identification information;

inputting a second image obtained by capturing the white paper, placed under an illuminant having unknown illuminant information, using the image capturing device; and estimating, by referring to the table, illuminant information of the illuminant having the unknown illuminant information from chromaticity of the second image analyzed in the analyzing step.

12. A computer-readable storage medium storing a computer-executable program for causing a computer to perform an image processing method, the method comprising the steps of:

storing a table generated in a color processing method according to claim 9 into a memory;

capturing white paper placed under an illuminant having unknown illuminant information;

analyzing a chromaticity of an image of the white paper captured in the capturing step; and estimating, by referring to the table, illuminant information of the illuminant having the unknown illuminant information from the chromaticity analyzed in the analyzing step.

* * * * *